United States Patent
Light-Holets

(10) Patent No.: US 9,243,538 B1
(45) Date of Patent: Jan. 26, 2016

(54) REDUCED EMISSIONS INTERNAL COMBUSTION ENGINE SYSTEMS

(71) Applicant: Cummins Inc., Columbus, IN (US)

(72) Inventor: Jennifer Kay Light-Holets, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 17 days.

(21) Appl. No.: 14/325,528

(22) Filed: Jul. 8, 2014

(51) Int. Cl.
| | |
|---|---|
| *F01N 3/10* | (2006.01) |
| *F01N 3/20* | (2006.01) |
| *F02B 29/04* | (2006.01) |
| *F02B 37/18* | (2006.01) |
| *F02M 25/07* | (2006.01) |

(52) U.S. Cl.
CPC ............... *F01N 3/208* (2013.01); *F02B 29/04* (2013.01); *F02B 37/18* (2013.01); *F02M 25/0706* (2013.01); *F02M 25/0753* (2013.01)

(58) Field of Classification Search
CPC ..... F02D 41/029; F01N 9/002; F01N 3/0842; F01N 3/035; F01N 13/02; F02M 25/0707; F02M 25/0709; F02M 25/071; F02M 25/0737; F02M 25/0726; F02M 25/0736
USPC ........ 60/273, 274, 278, 295, 301, 602, 605.2; 123/568.12, 542
See application file for complete search history.

(56) References Cited

U.S. PATENT DOCUMENTS

| | | | | |
|---|---|---|---|---|
| 5,924,280 | A * | 7/1999 | Tarabulski | B01D 53/8696 60/274 |
| 8,220,254 | B2 * | 7/2012 | Doring | B01D 53/9431 60/274 |
| 2011/0041477 | A1 * | 2/2011 | Mullins | F01N 3/0821 60/274 |
| 2011/0067396 | A1 | 3/2011 | Quigley et al. | |
| 2015/0226145 | A1 * | 8/2015 | Iwatani | F02D 41/025 60/285 |

FOREIGN PATENT DOCUMENTS

| | | | | |
|---|---|---|---|---|
| DE | 102006007122 A1 | * | 8/2007 | ............ F01N 3/0231 |
| EP | 0998625 | | 11/2004 | |
| EP | 2075050 | | 7/2009 | |
| JP | 2000282958 A | * | 10/2000 | |
| JP | 2008002355 A | * | 1/2008 | |
| WO | 2012067617 | | 5/2012 | |
| WO | WO 2012067617 | * | 5/2012 | |

* cited by examiner

*Primary Examiner* — Patrick Maines
(74) *Attorney, Agent, or Firm* — Taft, Stettinus & Hollister LLP

(57) ABSTRACT

Internal combustion diesel engine systems and methods of operation are disclosed that include a diesel engine, an exhaust gas recirculation system, a wastegated turbocharger, an exhaust throttle, and a vanadia selective catalytic reduction catalyst downstream of the exhaust throttle.

7 Claims, 2 Drawing Sheets

REDUCED EMISSIONS INTERNAL COMBUSTION ENGINE SYSTEMS

BACKGROUND

Internal combustion engines, such as diesel engines, are connected with exhaust systems that typically include aftertreatment systems to reduce emissions of pollutants from the tailpipe, such as NOx. Such aftertreatment systems can employ oxidation catalysts, particulate filters, and selective catalytic reduction (SCR) catalysts. Since SCR catalysts typically operate most efficiently at higher exhaust temperatures, certain exhaust heating strategies, such as hydrocarbon injection, oxidation catalysts, and/or variable geometry turbine (VGT) inlet control, are employed to increase or maintain the temperature of the SCR catalyst in its effective temperature range. However, these exhaust heating strategies and NOx emissions control with such systems are obtained at a high initial system cost, fuel penalties, and/or high operating costs over the life of the system.

SCR catalysts are subject to deterioration in performance resulting from the accumulation of various contaminants, such as sulphur and hydrocarbons, on the SCR catalyst. In exhaust systems that include particulate filters, active particulate filter regeneration can serve in part as a regeneration event for the SCR catalyst as well to remove sulphur poisoning. However, particulate filter regeneration results in a fuel penalty, and diesel particulate filters require servicing and additional expense in cost and operation of the aftertreatment system. In addition, while vanadia SCR catalysts provide improved NO conversion and tolerance to sulphur poisoning than other SCR catalysts, aftertreatment systems that employ particulate filters typically do not employ vanadia SCR catalyst due to their lack of thermal durability in high temperature conditions, such as those that occur during particulate filter regeneration.

Diesel engine exhaust systems also raise exhaust gas temperatures by controlling an opening of an inlet to a variable geometry turbine (VGT) in the exhaust system. However, VGT's are expensive and control of the opening can be complicated depending on engine operating conditions to achieve the desired result. Therefore, further technological developments are desirable in this area that provide a low cost exhaust and aftertreatment system for an internal combustion engine that are operable to meet emissions standards.

SUMMARY

Internal combustion engine systems and methods are disclosed that include an exhaust gas recirculation (EGR) system with an EGR control valve to control EGR flow from the exhaust system to the intake system, a turbocharger including a turbine with a wastegate, an exhaust throttle, and a vanadia SCR catalyst. The system and methods of operation of the system do not employ a VGT, oxidation catalyst or particulate filter. Emissions such as NOx are controlled by controlling engine NOx output levels and/or by raising or maintaining exhaust temperatures so the vanadia SCR catalyst is in its effective operating temperature range. Such operations can be achieved, for example, through control of the EGR control valve to regulate the amount of recirculated exhaust gas, control of the wastegate to regulate the amount of the exhaust gas through the wastegate and the turbine inlet, and control of the exhaust throttle to control the amount of exhaust gas to the vanadia SCR catalyst and temperature of the exhaust gas.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
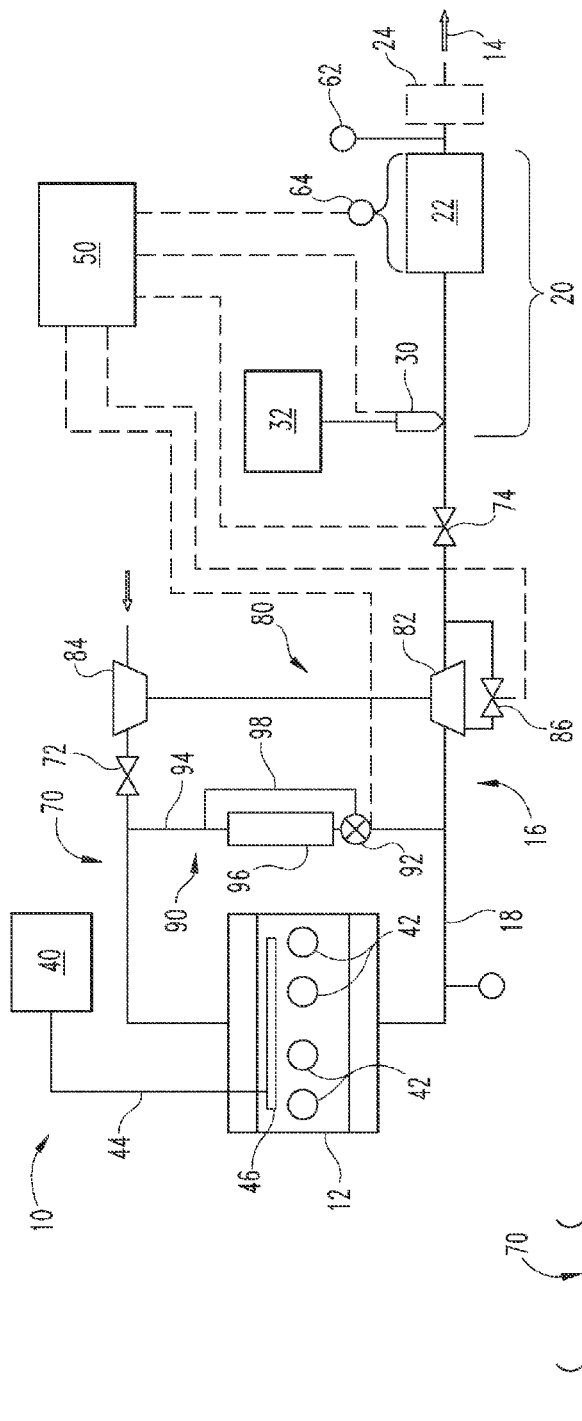
FIG. 1 is a schematic of a system that includes an internal combustion engine connected to an exhaust system with an EGR system, wastegated turbocharger, exhaust throttle and a vanadia SCR catalyst downstream of the exhaust throttle.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, there is shown a system 10 that includes an internal combustion engine 12 that is operable to produce an exhaust gas flow 14 into an exhaust system 16 connected to engine 12. The engine 12 may be a diesel engine, either as a stand-alone power source, in combination with other engines, or part of a hybrid power train including an internal combustion engine for at least one of the power sources. System 10 can be used for mobile applications such with a vehicle, locomotive, or marine application, or for stationary applications such as a power generation or pumping system.

Exhaust system 16 includes at least one exhaust flow path 18 for conveying the exhaust gas to and through an aftertreatment system 20. System 10 also includes an intake system 70 to provide a charge flow to engine 12 that includes intake air and recirculated exhaust gas. A turbocharger 80 is provided that includes a turbine 82 in exhaust flow path 18 and a compressor 84 in intake system 70. A wastegate 86 is provided at turbine 82 to provide an exhaust flow path that bypasses turbine 82 in response to certain operating conditions. In the illustrated embodiment, wastegate 86 is an external wastegate. Other embodiments contemplate an internal wastegate.

Figure 2:
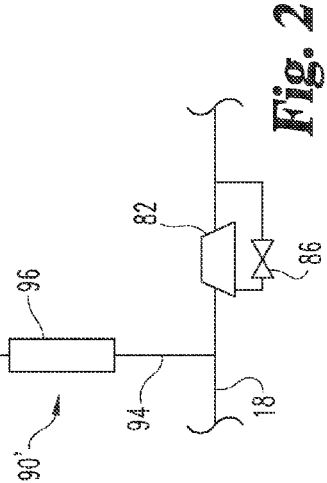
FIG. 2 is a schematic of an alternate arrangement of the EGR system.

Exhaust system 16 further includes an exhaust throttle 74 downstream of turbine 82. Intake system 70 may further include an intake throttle 72 downstream of compressor 84. An EGR system 90 includes an EGR conduit 94 connecting exhaust flow path 18 to intake system 70. In the illustrated embodiment, EGR system 90 is a high pressure system that is connected upstream of turbine 82 and downstream of compressor 84. EGR system 90 includes an EGR control valve 92 connected to EGR conduit 94 and an EGR cooler 96. An EGR bypass 98 is configured to bypass all or a portion of the EGR flow around EGR cooler 96. In the embodiment of EGR system 90 illustrated in FIG. 1, EGR control valve 92 is upstream of EGR cooler 96. In another embodiment EGR system 90', such as shown in FIG. 2, EGR valve 92 is downstream of EGR cooler 96 and/or an EGR cooler bypass is omitted. Exhaust throttle 74, intake throttle 72, wastegate 86, and EGR control valve 92 can be controlled by a controller 50 to facilitate control of the thermal output and/or NOx output from engine 12.

Aftertreatment system 20 includes at least one vanadia SCR catalyst 22 operationally coupled to the at least one exhaust flow path 18 from engine 12. It is contemplated that exhaust system 16 lacks any variable geometry turbines, oxidation catalysts, and particulate filters upstream of vanadia SCR catalyst 22, and, as discussed further below, exhaust throttle 74, wastegate 86, and EGR control valve 92 are operable to provide engine NOx output management and thermal management of aftertreatment system 20 to produce reduced NOx emissions from exhaust system 16 and temperature control of vanadia SCR catalyst 22.

Exhaust throttle 74, wastegate 86, and EGR control valve 92 each include an actuator that is operably connected to controller 50 to receive control signals that actuate the respective device to or between on-off or open-closed positions in response to operating parameters of engine 12 and the exhaust system 16 to provide NOx output management from and temperature management of the aftertreatment system 20. Exhaust throttle 74 and/or EGR control valve 92 can include any suitable valve member in the exhaust flow path that is actuatable between at least two positions, such as an open/on position, and a closed/off position, although full authority valve members are not precluded. The valve members of exhaust throttle 74 and/or EGR control valve 92 can be, for example, a butterfly type valve, a guillotine-type valve, or a ball-type valve. In one embodiment, the flow restricting portion of the valve of exhaust throttle 74 includes a passage so that when the valve is closed or off, a minimum exhaust flow is permitted to pass therethrough that is set at a targeted low load condition of engine 12. The actuators can be an electronic actuator, an electric motor, a pneumatic actuator, or any other suitable type of actuator to operate the valve member of the exhaust throttle 74, wastegate 86 and EGR control valve 92.

In one embodiment of system 10, exhaust gas flow 14 passes in order from at least one of turbine 82 and wastegate 86, directly to exhaust throttle 74, and then directly to vanadia SCR catalyst 22. Aftertreatment system 20 is designed to operate without intervening particulate filtration or an oxidation reaction upstream of vanadia SCR catalyst 22, and omits any particulate filter and oxidation catalyst upstream of vanadia SCR catalyst 22. As a result there are no active regeneration events in the operation of system 10 that are directed to regeneration of a particulate filter or oxidation reactions upstream of vanadia SCR catalyst 22, reducing the exposure of vanadia SCR catalyst 22 to high impact thermal events typically associated with particulate filter regeneration and oxidation reactions.

Exhaust aftertreatment system 20 may include a reductant injector 30 upstream of vanadia SCR catalyst 22 and downstream of exhaust throttle 74. Reductant injector 30 is supplied with reductant from a reductant source or reservoir 32 and is operable to inject reductant into the exhaust gas flow 14 in exhaust flow path 18. In an exemplary embodiment the reductant is a diesel exhaust fluid (DEF) such as urea which decomposes to provide ammonia. Other embodiments utilize different reductants, for example, aqueous solutions of ammonia, anhydrous ammonia, or other reductants suitable for SCR operations. Reductant injected into exhaust flow path 18 is provided to vanadia SCR catalyst 22 which is in flow communication with exhaust flow path 18 and is operable to catalyze the reduction of NOx.

Exhaust flow path 18, as illustrated schematically in FIG. 1, proceeds from the output of engine 12, through a conduit to a connection of EGR system 90, then to turbine 82, then to exhaust throttle 74, and then to a structure containing vanadia SCR catalyst 22 and through another conduit which outlets to the ambient environment. Certain embodiments may also include an ammonia oxidation AMOX catalyst 24 at a position downstream of, or one the downstream side of, the vanadia SCR catalyst 22, which is operable to catalyze the reaction of $NH_3$ which slips past the SCR catalyst 22.

Engine 12 produces exhaust gas flow 14 by combustion of fuel provided from fuel source 40 of a fuelling system. Fuel source 40, in the illustrated embodiment, is connected to a plurality of cylinders 42 of engine 12 with one or more fuel lines 44. In one embodiment, the fuel system is provided with a common rail 46 that distributes fuel to cylinders 42 with one or more injectors (not shown) at each cylinder 42, which are connected to a common rail 46 of the fuel system. It is further contemplated that any suitable connection arrangement with fuel source 40, injection location, and/or injector type can be used to provide fuel directly and/or indirectly to the combustion chambers of cylinders 42.

In certain embodiments, the system 10 further includes a controller 50 structured or configured to perform certain operations to initiate a temperature change event and/or NOx reduction event, and control engine operations, EGR operations, wastegate operations, and exhaust throttle operations to produce an engine out NOx amount and/or exhaust gas flow temperature that results in a desired NOx reduction in the engine output and/or change in temperature of the exhaust gas flow 14. In certain embodiments, the controller 50 can be an engine control module and/or forms a portion of a processing subsystem including one or more computing devices having memory, processing, and communication hardware. The controller may be a single device or a distributed device.

System 10 may further include various sensors associated with engine 12 and exhaust system 16 that provide outputs to controller 50 that are processed by controller 50 to control operations to reduce NOx output from engine 12 or change the temperature of the exhaust gas flow 14. As used herein, unless specified otherwise, a sensor may be a physical sensor that directly measures an operating condition or output of system 10, or a virtual sensor in which the operating condition or output is determined from one or more other sensors and operating parameters. Not all sensors typically associated with system 10 are shown, and the illustrated sensors are provided for purposes of illustration and not limitation.

System 10 includes at least one sensor 62 that provides an output to controller 50 to indicate or determine therefrom a NOx amount at the outlet of vanadia SCR catalyst 22, and at least one sensor 64 providing an output to controller 50 to indicate a temperature control operation of system 10 during a temperature change event for SCR catalyst 22, such as a temperature sensor 64. Additional sensors may be provided, but are not required, to measure the exhaust flow, an engine out NOx amount, a temperature of the exhaust gas flow or exhaust component upstream of vanadia SCR catalyst 22, sense a condition of engine 12 such as engine speed or load, measure an NH3 amount at one or more locations along exhaust system 16, such as at a mid-bed location and/or an outlet of vanadia SCR catalyst 22.

In one embodiment, the at least one vanadia SCR catalyst 22 is a reduction catalyst that reduces an amount of the $NO_x$ during nominal operation, at least partially converting $NO_x$ to $N_2$ to reduce the emissions of the internal combustion engine 12. In certain embodiments, aftertreatment system 20 includes an ammonia oxidation (AMOX) catalyst 24 that is provided downstream of vanadia SCR catalyst 22, either as a separate device or as a washcoat applied to a downstream side or portion of vanadia SCR catalyst 22. Embodiments without an AMOX catalyst 24 are also contemplated.

The SCR aftertreatment system 20, during nominal operation, may reduce $NO_x$ emissions in the presence of a reductant such as ammonia. The ammonia, where present, may be provided by injection of urea, which converts to ammonia after evaporation and hydrolysis in the exhaust gas, and/or by injection of ammonia directly, and/or by other suitable means. Any suitable reductant storage and injection means are contemplated, including storage of the reductant in a liquid medium and/or in a solid storage medium.

Since exhaust system 16 lacks a particulate filter that requires regeneration and an upstream oxidation catalyst, the thermal conditions created during particulate filter regeneration that cause hydrothermal aging of a vanadia SCR catalyst can be avoided or minimized. Use of a vanadia SCR catalyst 22 can be advantageous due to the greater activity for NO removal and tolerance to sulphur poisoning that is provided. However, vanadia SCR catalyst 22 is most effective in reducing NOx when a temperature condition of the SCR catalyst is in an effective temperature range for removing NOx. In one embodiment, the effective temperature for efficient $NO_x$ conversion by vanadia SCR catalyst 22 is a temperature above about 200° C. and up to about 400° C., although other effective temperature ranges and lower thresholds are contemplated depending on catalyst formulation, feed gas composition, and other parameters. As used herein a low temperature condition is a condition in which the temperature of vanadia SCR catalyst 22 is less than the effective temperature threshold, such as about 200° C., of vanadia SCR catalyst 22.

The systems and method disclosed herein determine at least one parameter associated with operation of the system that indicates a temperature condition of the vanadia SCR catalyst 22 and initiate a temperature change event by controlling engine fuelling and controlling at least one of wastegate 86, exhaust throttle 74 and EGR control valve 92 to produce an exhaust gas flow that provides a temperature condition for vanadia SCR catalyst 22 that moves the temperature condition of vanadia SCR catalyst 22 into or toward its effective temperature range.

In one embodiment, the temperature change event includes changing an amount of exhaust gas recirculated to the intake system 70 to change the temperature of the exhaust gas flow to vanadia SCR catalyst 22 by controlling EGR control valve 92 and/or the amount of exhaust gas passing through EGR cooler 96. For example, EGR cooler 96 can be bypassed in response to a temperature change event indicating a temperature increase of the exhaust gas flow and vanadia SCR catalyst 22. In another embodiment, the temperature change event alternatively or additionally includes changing an amount of exhaust gas passing through at least one of the wastegate 86 of the turbocharger 80, and/or through the exhaust throttle 74 to increase backpressure on engine 12 and pumping work to increase or decrease combustion temperatures, changing the temperature exhaust gas flow and therefore the temperature of vanadia SCR catalyst 22.

The systems and method disclosed herein determine at least one parameter associated with operation of the system that indicates a NOx output from the vanadia SCR catalyst 22 and initiate a NOx reduction event in response to the NOx output exceeding a threshold amount by controlling engine fuelling and controlling at least one of wastegate 86, exhaust throttle 74 and EGR control valve 92 to reduce an engine out NOx amount that will reduce the NOx output from vanadia SCR catalyst 22 toward or below the threshold amount.

In one embodiment, the NOx reduction event includes closing at least one of the wastegate 86 and the exhaust throttle 74 to increase an amount of exhaust gas flow recirculated to the intake system 70. In another embodiment, the NOx reduction event alternatively or additionally includes at least partially closing each of the wastegate 86 and the exhaust throttle 74 to increase an amount of exhaust gas flow recirculated to the intake system 70. In a further embodiment, the NOx reduction event includes opening the EGR control valve 92 to increase an amount of recirculated exhaust gas to the intake system 70. In another embodiment, when the wastegate 86 is open, the NOx reduction event includes closing the exhaust throttle 74 to provide a minimum exhaust flow and increase the EGR flow to reduce the NOx output from the engine 12. The exhaust throttle 74 provides an additional control lever that is operable independently of the wastegate 86 to control EGR flow to manage NOx output and/or temperature conditions of the vanadia SCR catalyst 22.

Figure 3:
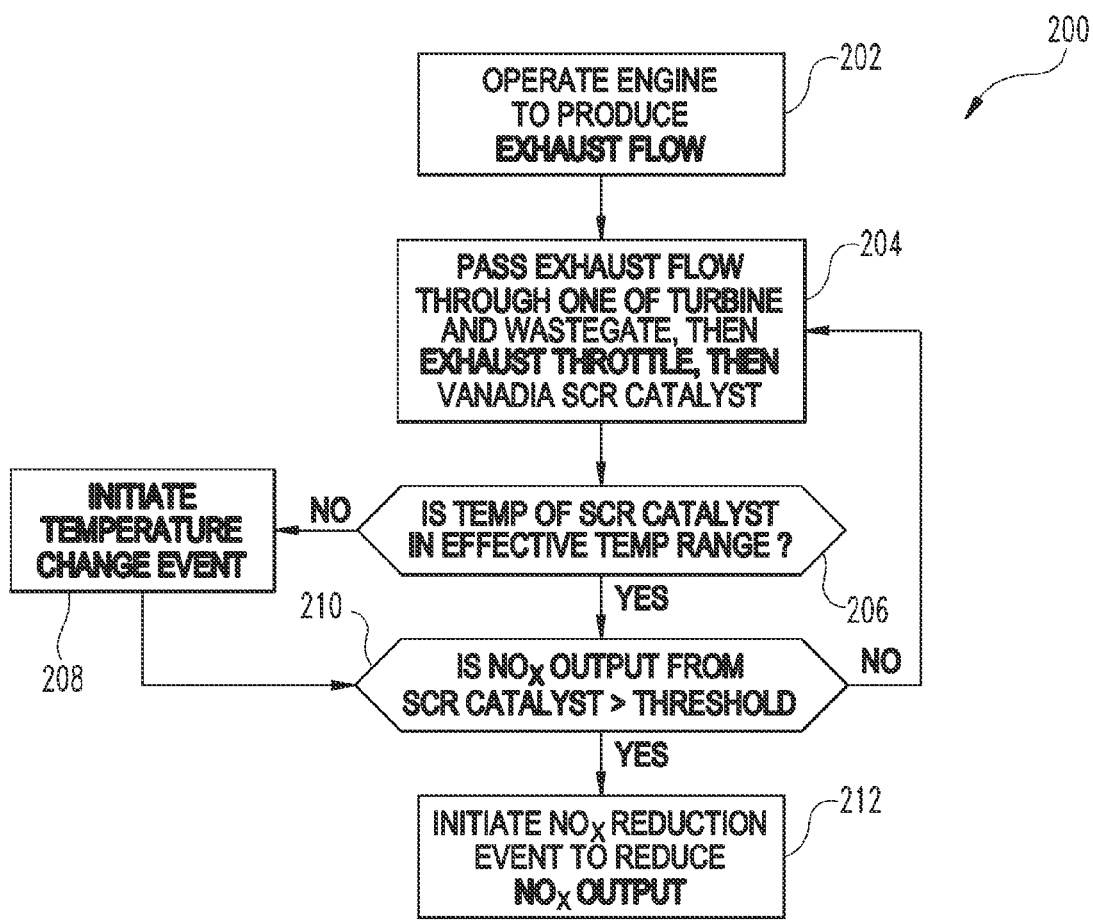
FIG. 3 is a flow diagram of a procedure for operating the system of FIG. 1.

The schematic flow diagram in FIG. 3 and related description which follows provides an illustrative embodiment of performing procedures for reducing NOx output from engine 12 and a temperature change event to control operations of system 10 to meet desired NOx emissions amounts. Operations illustrated are understood to be exemplary only, and operations may be combined or divided, and added or removed, as well as re-ordered in whole or part, unless stated explicitly to the contrary herein. Certain operations illustrated may be implemented by a computer, such as controller 50, executing a computer program product on a computer readable medium, where the computer program product comprises instructions causing the computer to execute one or more of the operations, or to issue commands to other devices to execute one or more of the operations.

Procedure 200 includes an operation 202 that includes operating the internal combustion engine 12 to procedure exhaust gas flow 14. Procedure 200 continues at operation 204 that includes passing the exhaust gas flow 14 through at least one of the turbine 82 and wastegate 86, then exhaust throttle 74, and then vanadia SCR catalyst 22. During operation 204, controller 50 receives signals indicative of a NOx output from vanadia SCR catalyst 22 and a temperature condition of vanadia SCR catalyst 22. In addition, controller 50 controls operations of reductant injector 30 to inject reductant into the exhaust gas flow 14 to reduce NOx over vanadia SCR catalyst 22. The determination of the reductant injection amount and timing of the injection can be accomplished with any suitable NOx reduction control scheme.

Procedure 300 continues at conditional 206 to determine if the temperature of vanadia SCR catalyst 22 is in its effective temperature range. If conditional 206 is negative, procedure 300 continues at operation 208 to initiate a temperature change event, as discussed above. With a temperature change event that involves the exhaust throttle 74 closed, fuelling of engine 12 from fuel source 40 can be conducted with a set of fuelling tables that are based on a closed exhaust throttle to provide fuel pressure, fuel amounts, start of injection, and injection timing in response to the load request to engine 12 and to increase a thermal output of engine 12, resulting in exhaust gas temperatures that are increased to provide a temperature condition for SCR catalyst 22 that is in the effective temperature range.

After completion of operation 208, or if conditional 206 is positive, procedure 200 then continues at conditional 210 to determine if the NOx output from vanadia SCR catalyst 22 is greater than a threshold amount. If conditional 210 is negative, procedure 200 returns to operation 204 and continues until operation of engine 12 is terminated. If conditional 210 is negative, procedure 200 continues at operation 212 to initiate a NOx reduction event to reduce NOx output from engine 12, as discussed above, by controlling one or more of EGR control valve 92, wastegate 86, and exhaust throttle 74.

Certain operations described herein include operations to interpret or determine one or more parameters. Interpreting and/or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

As is evident from the figures and text presented above, a variety of aspects, embodiments and refinements of the present disclosure are contemplated. According to one aspect, a method includes operating a system including an internal combustion engine to produce an exhaust gas flow to an exhaust system with a number of exhaust gas treatment and flow control components consisting essentially of a vanadia SCR catalyst, an exhaust throttle upstream of the vanadia SCR catalyst, a turbocharger with a controllable wastegate upstream of the vanadia SCR catalyst, and an EGR control valve connected with an EGR conduit connecting the exhaust system to an intake system to control recirculation of exhaust gas to the intake system. The method further includes reducing NOx in the exhaust gas flow with the vanadia SCR catalyst by injecting a reductant upstream of the vanadia SCR catalyst. The exhaust gas flow to the passes from the exhaust throttle directly to the vanadia SCR catalyst without an intervening particulate filter or oxidation catalyst between the exhaust throttle and the vanadia SCR catalyst.

In one embodiment, the method includes determining at least one parameter associated with operation of the system that indicates a NOx output level from the vanadia SCR catalyst. The NOx output event is caused at least in part by operating conditions of the vanadia SCR catalyst. In response to the NOx output event, the method includes initiating a NOx reduction event to reduce an amount of NOx to the vanadia SCR catalyst by reducing a NOx output by the internal combustion engine.

In a refinement of this embodiment, reducing the NOx output includes closing at least one of the wastegate and the exhaust throttle to increase an amount of exhaust gas flow recirculated to the intake system. In another refinement, reducing the NOx output includes at least partially closing each of the wastegate and the exhaust throttle to increase an amount of exhaust gas flow recirculated to the intake system. In yet another refinement, reducing the NOx output includes opening the EGR control valve to increase an amount of recirculated exhaust gas to the intake system.

In another embodiment, the method includes determining at least one parameter associated with operation of the system that indicates a temperature condition of the vanadia SCR catalyst and, in response to the temperature condition falling outside an effective temperature range, initiating a temperature change event to change a temperature of the vanadia SCR catalyst. In one refinement of this embodiment, the temperature change event includes changing an amount of exhaust gas recirculated to the intake system. In another refinement, the temperature change event indicates a temperature increase of the vanadia SCR catalyst and the method includes bypassing an EGR cooler connected to the EGR conduit to increase a temperature of the exhaust gas flow. In a further refinement, the temperature change event includes changing an amount of exhaust gas passing through at least one of the wastegate of the turbocharger and the exhaust throttle to change the temperature of the vanadia SCR catalyst.

In yet another refinement, the temperature change event includes changing an amount of exhaust gas passing through the exhaust throttle to change the temperature of the vanadia SCR catalyst. In yet another refinement, the temperature change event includes increasing a temperature condition of the vanadia SCR catalyst to the effective operating temperature range.

According to another aspect, a method includes operating a system including an internal combustion engine to produce an exhaust gas flow through an aftertreatment system including at least one vanadia SCR catalyst and a reductant injector upstream of the vanadia SCR catalyst. The aftertreatment is configured without a particulate filter and without an oxidation catalyst upstream of the vanadia SCR catalyst. The method includes determining a NOx output in the exhaust gas flow from the vanadia SCR catalyst and, in response to the NOx output being greater than a NOx output threshold, initiating a NOx output reduction event to reduce a NOx output by the internal combustion engine. The NOx output reduction event includes increasing an amount of recirculated exhaust gas by at least one operation including closing an exhaust throttle upstream of the vanadia SCR catalyst, closing a wastegate of a turbocharger upstream of the vanadia SCR catalyst, and opening an EGR control valve in an EGR system operable to provide exhaust gas flow to an intake of the internal combustion engine.

In one embodiment, the at least one operation includes closing the wastegate of the turbocharger and opening the EGR control valve. In another embodiment, the at least one operation includes closing the exhaust throttle and opening the EGR valve while the wastegate of the turbocharger is open. In yet another embodiment, the exhaust gas flow passes, in order, through at least one of the wastegate and the turbocharger, the exhaust throttle and the vanadia SCR catalyst.

According to yet another aspect, a system includes an internal combustion engine operable to receive an intake flow from an intake system and produce an exhaust gas flow to an exhaust system. The system also includes a turbocharger including a turbine in the exhaust system and a compressor in the intake system. The exhaust system includes an aftertreatment system with a vanadia SCR catalyst and a reductant injector connected to a reductant source upstream of the vanadia SCR catalyst. The exhaust system also includes an exhaust throttle upstream of the vanadia SCR catalyst and a wastegate associated with the turbine upstream of the exhaust throttle. The exhaust throttle receives exhaust gas flow from the turbine and the wastegate and the vanadia SCR catalyst receives exhaust flow from the exhaust throttle without an intervening particulate filter and without an intervening oxidation catalyst. The system further includes an EGR system connecting the exhaust system to the intake system, and the EGR system includes an EGR cooler to cool recirculated exhaust gas flow and an EGR control valve operable to control an amount of recirculated exhaust gas.

In one embodiment, the EGR system includes an EGR bypass around the EGR cooler. In a refinement of this embodiment, the EGR control valve is upstream of the EGR cooler. In another refinement, the EGR control valve is downstream of the EGR cooler.

In another embodiment, the wastegate is an external wastegate. In a further embodiment, the engine is a diesel engine. In yet another embodiment, the EGR system is connected to the exhaust system upstream of the turbine.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
    operating an internal combustion engine to produce an exhaust gas flow through an exhaust system including at least one vanadia selective catalytic reduction (SCR) catalyst, an exhaust throttle upstream of the vanadia SCR catalyst, a turbocharger with a controllable wastegate upstream of the exhaust throttle, and an EGR control valve connected with an EGR conduit connecting the exhaust system to an intake system to control recirculation of the exhaust gas flow to the intake system;
    passing the exhaust gas flow directly to the vanadia SCR catalyst from the exhaust throttle without an intervening particulate filter upstream of the vanadia SCR catalyst and without an intervening oxidation catalyst upstream of the vanadia SCR catalyst;
    determining an NOx output in the exhaust gas flow downstream of the vanadia SCR catalyst;
    initiating a NOx output reduction event to reduce an NOx output by the internal combustion engine in response to the NOx output in the exhaust gas flow downstream of the vanadia SCR catalyst being greater than a threshold amount; and
    at least partially closing each of the wastegate and the exhaust throttle to execute the NOx output reduction event, thereby increasing an amount of exhaust gas flow recirculated to the intake system.

2. A system, comprising:
    an internal combustion engine to produce an exhaust gas flow;
    an exhaust system including at least one vanadia selective catalytic reduction (SCR) catalyst;
    an exhaust throttle upstream of the vanadia SCR catalyst, without an intervening particulate filter between the exhaust throttle and the vanadia SCR catalyst and without an intervening oxidation catalyst between the exhaust throttle and the vanadia SCR catalyst;
    a turbocharger with a controllable wastegate upstream of the exhaust throttle; and
    an EGR control valve connected with an EGR conduit connecting the exhaust system to an intake system to control recirculation of the exhaust gas flow to the intake system; and
    a controller configured to:
    determine an NOx output in the exhaust gas flow downstream of the vanadia SCR catalyst;
    initiate a NOx output reduction event to reduce an NOx output by the internal combustion engine in response to the NOx output in the exhaust gas flow downstream of the vanadia SCR catalyst being greater than a threshold amount; and
    at least partially close each of the wastegate and the exhaust throttle to execute the NOx output reduction event, thereby increasing an amount of exhaust gas flow recirculated to the intake system.

3. The system of claim 2,
    further comprising: an EGR cooler connected to the EGR conduit; and
    an EGR bypass around the EGR cooler.

4. The system of claim 3, wherein the EGR control valve is upstream of the EGR cooler.

5. The system of claim 3, wherein the EGR control valve is downstream of the EGR cooler.

6. The system of claim 2, wherein the wastegate is an external wastegate.

7. The system of claim 2, wherein the internal combustion engine is a diesel engine.

* * * * *